June 3, 1969 J. C. SHANNON 3,447,816
THREE-POINT TRACTOR-IMPLEMENT HITCH
Filed Feb. 8, 1967
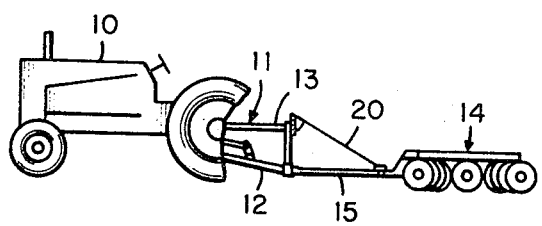
FIG. 1
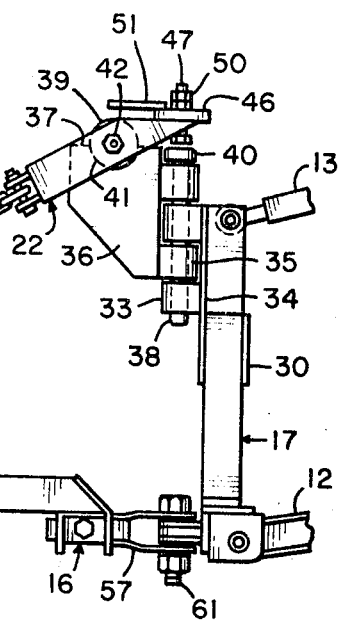
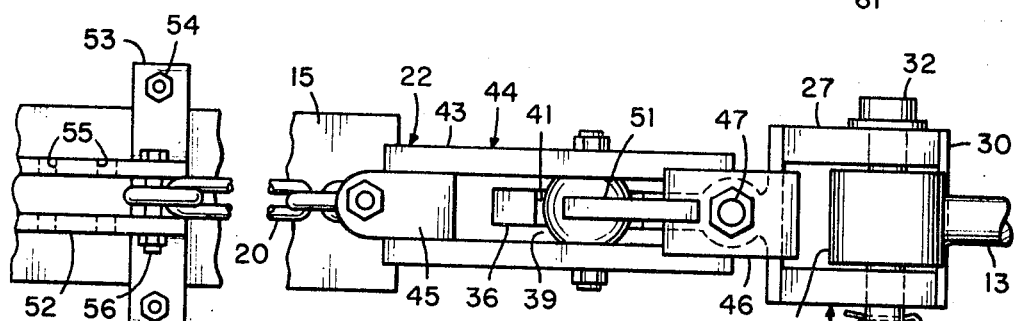
FIG. 2
FIG. 4
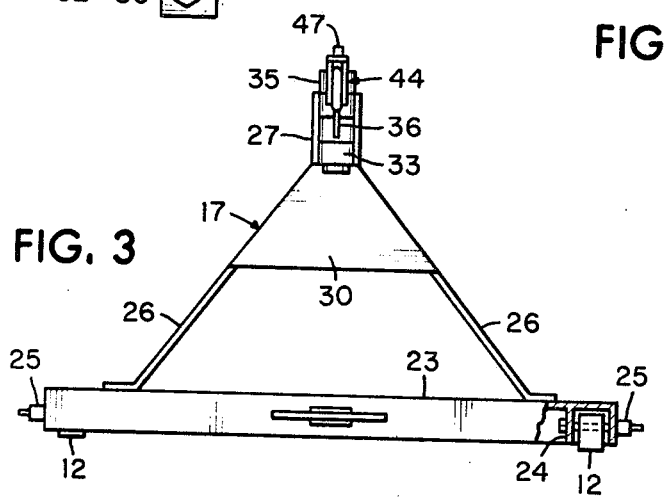
FIG. 3
INVENTOR
JEFFERSON C. SHANNON
BY Cohn and Powell
ATTORNEYS United States Patent Office 3,447,816
Patented June 3, 1969

3,447,816
THREE-POINT TRACTOR-IMPLEMENT HITCH
Jefferson C. Shannon, % Shannon Tractor Company, Inc., P.O. Box 808, Yazoo City, Miss. 39194
Filed Feb. 8, 1967, Ser. No. 614,627
Int. Cl. B60d 1/14; B60r 21/02
U.S. Cl. 280—452                                     9 Claims

ABSTRACT OF THE DISCLOSURE

A three-point tractor-implement hitch for connecting and transferring weight from the implement to the rear wheels of the tractor. The drawbar of the implement is hinged to a rigid frame mounted on the three hitch links of the tractor. A draft member connects the implement drawbar to an upper portion of the frame and includes a safety coupling device that functions to disconnect the draft member in the event that excessive weight transfer or tension, exerted by the draft member on the rigid frame upon disconnection of the drawbar, tends to upend the tractor.

Background of the invention

This invention relates generally to improvements in a tractor hitch, and is chiefly concerned with an improved hitch for connecting an agricultural implement, such as a plow or harrow, to a tractor equipped with a three-point draft linkage.

Farm tractors are commonly equipped with a draft-transmitting coupling element at their underside, and with a power lift mechanism at the rear, including lift arms. Hitch devices for use in connection with tractors of this type have heretofore been suggested which served the dual function of transmitting draft from the tractor to a trailing implement, and of transmitting weight from the implement to the tractor when needed for increased traction, as disclosed, for example, in U.S. Patents Nos. 2,930,-630, 3,116,939 and 3,204,984. Because the weight has been lessened from the front wheels of the tractor and placed on the back wheels, the tractor tends to skid and steering is impaired during turns. Moreover, in the event of a failure of the main coupling connecting the implement to the drawbar, the entire draft load is transferred to the upper draft link of the three-point draft linkage, to cause the tractor to become upended and to overturn.

Summary of the invention

The improved hitch utilizes the tractor lift mechanism for effecting controlled transfer of a part of the implement's weight to the tractor drive wheels so as to increase traction where such is required for operation on soft ground or under other adverse conditions. A safety coupling means prevents injury to the tractor driver in the event of disconnection of the main coupling connecting the implement drawbar. The safety coupling means, operatively connecting the implement drawbar and the rigid frame carried by the three-point hitch, is automatically disconnected to relieve the tractor of upending forces.

The weight transfer tractor hitch includes adjustment provisions which enable a maximum amount of weight to be transferred without materially altering the level or other normal operating position of the implement.

In using the present tractor hitch assembly, the weight added to the rear wheels of the tractor, or a substantial portion thereof, during the course of a straight run, will automatically be removed from the rear wheels and restored to the implement and front wheels of the tractor. Just prior to turning, the implement wheels are lowered by the tractor hydraulic system. The weight is then restored. Weight is further restored during the turn as the draft member slackens. By restoring weight to the front wheels during turning, front wheel skid is prevented and steering is facilitated.

A substantially rigid frame structure by which the two lower hitch links and the upper hitch link of a three-point draft linkage are all interconnected for conjoint vertical movement responsive to the hydraulic mechanism or other operating unit forming a part of the tractor equipment.

A swivel joint comprises the main connection by which the end of the implement drawbar is attached to the lower transverse part of the rigid frame. A secondary connection, constituting a draft member, in the form of a single chain or cable, or a double chain in a U-formation, is attached to the implement drawbar rearwardly of the swivel joint. The safety coupling means releasably connects the opposite or upper end of the flexible draft member to the rigid frame above the swivel joint, the safety coupling means including separable, yet interconnecting, parts that separate automatically upon tilting the frame to a predetermined angle under tension of the draft member, and thereby prevent the front end of the tractor from rearing upwardly such as would cause the tractor to overturn.

Brief description of the drawing

FIG. 1 illustrates a tractor and implement interconnected by the improved hitch.

FIG. 2 is a vertical side elevational view of the hitch, showing portions of the implement drawbar and tractor hitch links in assembled relation;

FIG. 3 is a front elevational view of the hitch, and

FIG. 4 is an enlarged top plan view illustrating the safety coupling means at the upper end of the flexible draft member, and showing the connection of the flexible draft member with the implement drawbar.

Description of the preferred embodiment

Referring now by characters of reference to the drawing, and first to FIG. 1, it will be understood that the tractor 10 is equipped with a three-point draft linkage generally indicated by 11. The draft linkage 11 includes a lower pair of horizontally spaced draft links 12, only one of which is illustrated in FIG. 1, and a single upper draft link 13 centrally located with respect to draft links 12. Hydraulic means (not shown) is powered by the tractor engine and selectively controls the raising and lowering of one or more of the draft links 12 and 13. In some tractors 10, as for example a model manufactured by both Allis-Chalmers and Massey-Ferguson, the two lower draft links 12 constitute the hydraulic lift members, while in another model manufactured by Massey-Ferguson, the top draft link 13 is connected to the hydraulic means and constitutes the hydraulic lift member.

A disc harrow referred to by 14 in FIG. 1 is representative of the type of implement to which the hitch of the present invention is particularly applicable. The harrow 14 is shown equipped with a drawbar 15 having an end fitting 16 (FIG. 2) for connection in the manner later described in detail to the eye member of the hitch frame bar 33.

The hitch includes a rigid, substantially A-frame 17 to which the tractor draft links 12 and 13 are interconnected for conjoint raising and lowering movement. A flexible draft member 20, provided by a link of chain, is connected at one end to the implement drawbar 15 by a coupling means 21, and is releasably connected at the opposite upper end to the rigid frame 17 by a safety coupling means 22.

Specifically, the A-frame 17 includes a heavy transverse bar 23 (FIG. 3) having suitable provision for connection at each end with one of the lower tractor draft links 12.

In the present example, the transverse bar 23 has a pair of spaced apertured plates 24 at each end, each pair of cooperating plates 24 being arranged to receive there between the apertured end of one of the lower draft links 12. A removable, coupling pin 25 extends through the aligned apertures of the plates 24 and the associated draft link 12, to secure these parts together pivotally.

Rising from the transverse bar 23 is a pair of upwardly convergent frame members 26 welded, or otherwise rigidly secured to the transverse bar 23 near its ends, the convergent frame members 26 terminating in substantially vertical, parallel end parts 27. Gusset plates 30 are welded to the upper front and rear edges of frame members 26, and serve to reinforce the frame 17.

The apertured end 31 of the top draft link 13, extends into the space between the end parts 27, the end parts 27 being apertured to receive a coupling pin 32 that pivotally secures the top draft link 13 to the top of the A-frame 17.

One of the separable, yet interconnected, parts of the safety coupling means 22 is carried by the draft member 20, and the other cooperating part is carried by A-frame 17. The safety coupling part carried by the A-frame 17 includes a hinge knuckle 33 that is fixed to a base plate 34, the base plate 34 being fixed to the frame end parts 27. Coacting with the hinge knuckle 33 is a matching knuckle 35 fixed to and projecting from the forward edge of a vertical plate 36. A vertical hinge pin 38, defining a hinge axis, extends through the interfitting knuckles 33 and 35, thereby completing the hinge connection by which plate 36 is enabled to swing laterally.

The plate 36 is preferably disposed with its upper horizontal edge surface 37 substantially at the level of the upper end surface of the hinge pin head 40. The plate 36 is provided with a semi-circular recess 41 defining a semicircular seat, the purpose and function of which will be later described.

The safety coupling part carried by the draft member 20 includes a ball-type roller 39, constituting a latch member, rotatively mounted by an axle 42 between the paired arms 43 of a clevis, referred to by 44, which is connected by a strap and bolt assembly 45 to the upper end of the draft member 20. When the parts comprising the safety coupling means 22 are operatively interconnected, the roller 39 is received and retained in the cooperating plate recess 41 under tension of the draft member 20.

The side arms 43 of the clevis 44 project forwardly beyond the roller 39, the end portions of the clevis arms 43 being bridged by a horizontal plate 46. The horizontal plate 46 is rigidly secured to the clevis arms 43 and is disposed in overlying and lapping relation to the hinge pin 38. The plate 46 has a threaded aperture disposed in axial vertical alignment coincident with the hinge axis defined by the hinge pin 38. A set-screw 47, constituting an adjustable pry rod, is located in the plate aperture and is vertically adjustable so that the set screw 47 will abut the hinge pin head 40 under certain conditions hereinafter explained, to cause the roller 39 to be lifted and operatively disconnected from the plate 36. The threaded nuts 50 mounted on the set screw 47 serve to lock the set screw 47 in adjusted position.

A projection 51 is secured to the clevis plate 46 and extends over the roller 39 to prevent the clevis 44 from being applied to the swivel plate 36 in a relatively inverted position from that shown in FIG. 2.

At its lower end, the draft member 20 is secured to the implement drawbar 15 at any one of a series of longitudinally spaced points, widely spaced from the forward end of the drawbar 15. The coupling means 21 includes a pair of opposed plates 52 welded to transverse base members 53. U-shaped bolts 54 embrace the drawbar 15 and rigidly secure the base members 53. The opposed plates 52 provided with a horizontal series of aligned apertures 55. A bolt 56 is inserted through an end link of a chain comprising the draft member 20 and through any selected pair of aligned apertures 55, the bolt 56 securing the lower end of the draft member 20 to the drawbar 15.

The coupling means 21, the draft member 20 and the coupling means 22 constitute a so-called secondary safety coupling or connection for the implement drawbar 15 with the hitch frame 17.

The primary connection for the implement drawbar 15 is provided by the coupling means 16. The coupling means 16 includes a clevis 57 secured to and projecting beyond the end of drawbar 15. A cooperating eye member is secured to and projects rearwardly from the frame bar 23 at an intermediate point, the eye member being disposed within the clevis 57. A substantially vertical bolt 61, defining a pivot axis, interconnects the clevis 57 and the eye member. The opening in the eye member for the bolt 61 is preferably slightly oval-shaped or enlarged so as to permit the implement drawbar 15 to rock vertically through a limited angular range, such as tends to occur when the implement 14 is drawn through uneven terrain, without binding or causing damage to the parts of this main coupling means 16.

The vertical axes of coupling bolt 61 and hinge pin 38 are preferably not in alignment, the hinge axis defined by the hinge pin 38 being disposed forwardly of the pivot axis defined by the coupling bolt 61. By such arrangement, the tension in the draft member 20 will be at a maximum when the tractor 10 and implement 14 are longitudinally aligned as in the course of a straight run, and the tension in the draft member 20 will be reduced when the disc wheels are lowered to the ground and will be further reduced when the tractor 10 is in an angle to the implement 14 as when turning.

It is thought that the functional advantages of the tractor hitch have become fully apparent from the foregoing detailed description of parts, but for completeness of disclosure, the operation and usage will be briefly described.

When the tractor draft linkage 11 is lowered, as by means of the hydraulic system, to a point where the draft member 20 is in a relaxed state under no tension, there will be no transfer of the implement's weight or loading to the tractor ground wheels. By raising the tractor draft links 12 and 13, the draft member 20 first becomes taut and, with increased elevation of the upper end of the safety coupling means 22, the implement 14 tends to be lifted, causing a portion of the implement's weight to be transferred from its own ground contact members to the rear wheels of the tractor 10, thus increasing traction.

By selecting the appropriate pair of holes 55 in the anchor plates 52 for the anchorage of the lower end of the draft member 20, the weight may be shifted from implement 14 to tractor 10 with a minimum of vertical movement of the implement hitch points provided by the connection of the draft links 12 and 13 to the A-frame 17. Adjustment of the lower anchorage of the draft member 20 enables the implement 14 to be operated in a level or other usual operating position while attaining the desired increment of weight transfer.

The additional weight of the implement applied to the tractor draft links 12 and 13 also results in a reduction in the bearing load at the tractor front wheels and results in a transfer of that increment of weight from the front wheels to the tractor rear wheels.

In the event of a failure of the main coupling means 16 such that the entire draft load is transferred to the draft member 20, forces may be generated therein sufficient to cause the tractor 10 to become upended and to overturn. Such a hazardous condition is prevented in the hitch of the present invention. By appropriately adjusting the position of the set screw 47 to provide the desired spacing between the lower end of such set screw 47 and the upper surface of the hinge pin head 40, any appreciable rearing of the front wheels, and consequently a tilting of the rigid A-frame 17 to a predetermined angle, will cause a disconnection of the parts comprising the safety coupling means 22. Specifically, when the rigid, A-frame 17 is tilted to the predetermined angle, the set screw 47 will engage in the hinge pin head 40, and the set screw 47, acting as a pry means, will unseat the roller 39 from its coacting recess 41.

It has heretofore been mentioned that the offset relationship between the hinge pin 38 and the coupling bolt 61 results in a relaxing of the draft member 20 when the drawbar 15 swings from a straight line to an angular position with respect to the tractor 10, as when the tractor is being turned. Weight restored to the front wheels of the tractor 10 tends to prevent skidding and facilitates steering during turns.

Having described the invention with reference to a practical, operative embodiment, it will be understood that changes may be made in the exemplary hitch herein described, without departing from the spirit and scope of the invention.

I claim as my invention:

1. In a hitch for connecting an implement drawbar to a three-point draft linkage of a tractor, the improvement comprising:
   (a) a rigid frame,
   (b) means operatively connecting the frame to the draft linkage,
   (c) a first coupling means pivotally connecting the implement drawbar operatively to the tractor,
   (d) a draft member,
   (e) means attaching the draft member to the drawbar rearwardly of said first coupling means,
   (f) a safety coupling means operatively connecting the draft member to the frame above the first coupling means, the safety coupling means including separable, yet interconnected parts and a pry means attached to one of said parts, the parts separating under prying action automatically upon tilting the frame to a predetermined angle under tension of the draft member.

2. In a hitch for connecting an implement drawbar to a three-point draft linkage of a tractor, the improvement comprising:
   (a) a rigid frame,
   (b) means operatively connecting the frame to the draft linkage,
   (c) a first coupling means pivotally connecting the implement drawbar to the frame,
   (d) a draft member,
   (e) means attaching the draft member to the drawbar,
   (f) a safety coupling means operatively connecting the draft member to the frame above the first coupling means, the safety coupling means including separable, yet interconnected parts, the parts separating automatically upon tilting the frame to a predetermined angle under tension of the draft member,
   (g) the draft member being attached to the drawbar rearwardly of the first coupling means and below the safety coupling means,
   (h) the first coupling means including a pivot connection between the drawbar and frame, the pivot connection defining a pivot axis,
   (i) the safety coupling means including a hinge connection with the frame on a hinge axis substantially parallel to and in the same direction as the pivot axis of the first coupling means, and
   (j) the draft member is flexible and operatively under tension,
   (k) the hinge axis and pivot axis being located in the same plane with the drawbar and draft member, yet the pivot axis being located rearwardly from the hinge axis.

3. A hitch as defined in claim 2, in which:
   (1) the means attaching the draft member to the drawbar adjustably positions the attachment along the length of the drawbar so as to adjust the angle between the draft member and frame selectively.

4. In a hitch for connecting an implement drawbar to a three-point draft linkage of a tractor, the improvement comprising:
   (a) a rigid frame,
   (b) means operatively connecting the frame to the draft linkage,
   (c) a first coupling means pivotally connecting the implement drawbar operatively to the tractor,
   (d) a flexible draft member operatively under tension,
   (e) means attaching the draft member to the drawbar,
   (f) a safety coupling means operatively connecting the draft member to the frame above the first coupling means, the safety coupling means including separable, yet interconnected parts, the parts separating automatically upon tilting the frame to a predetermined angle under tension of the draft member,
   (g) the draft member being attached to the drawbar rearwardly of the first coupling means and below the safety coupling means,
   (h) one of the separable, yet interconnected, parts of the safety coupling means being carried by the draft member, and the other part being carried by the frame, and
   (i) the safety coupling means including means selectively engaging to separate the parts automatically when the frame is tilted to the predetermined angle, said means being adjustably pre-set to cause separation at a selected predetermined tilt of the frame relative to the draft member.

5. In a hitch for connecting an implement drawbar to a three-point draft linkage of a tractor, the improvement comprising:
   (a) a rigid frame,
   (b) means operatively connecting the frame to the draft linkage,
   (c) a first coupling means pivotally connecting the implement drawbar to the frame,
   (d) a draft member,
   (e) means attaching the draft member to the drawbar,
   (f) a safety coupling means operatively connecting the draft safety coupling means including separable, yet interconnected parts, the parts separating automatically upon tilting the frame to a predetermined angle under tension of the draft member,
   (g) one of the separable, yet interconnected parts including a plate provided with a recess, the other interconnected part including a latch member received and operatively retained in the plate recess, and
   (h) a pry means carried by one of the interconnected parts, the pry means selectively engaging the other interconnected part when the frame is tilted to a predetermined angle under tension of the draft member so as to pry the latch member from the plate recess and operatively disconnect the parts.

6. In a hitch for connecting an implement drawbar to a three-point draft linkage of a tractor, the improvement comprising:
   (a) a rigid frame,
   (b) means operatively connecting the frame to the draft linkage,
   (c) a first coupling means pivotally connecting the implement drawbar to the frame,
   (d) a draft member,
   (e) means attaching the draft member to the drawbar,
   (f) a safety coupling means operatively connecting the draft safety coupling means including separable, yet interconnected parts, the parts separating automatically upon tilting the frame to a predetermined angle under tension of the draft member,
   (g) one of the separable, yet interconnected parts including (1) a plate provided with a recess, and (2) a hinge pin hingedly connecting the plate to the frame, and
   (h) the other interconnected part including (1) a latch member received and operatively retained in the plate recess, the latch member being carried by the draft member, (2) a plate carried by the draft member and lapping the hinge pin, and (3) a pry rod adjustably mounted to the last said plate and selectively engaging the hinge pin when the frame is tilted to the predetermined angle under tension of the draft member so as to pry the latch member from the recess and operatively disconnect the parts.

7. A hitch as defined in claim 6, in which:
(i) the means attaching the draft member to the drawbar adjustably positions the attachment along the length of the drawbar so as to adjust the angle between the draft member and the frame selectively.

8. A hitch as defined in claim 7, in which:
(j) the first coupling means includes a pivot connection between the drawbar and frame, the pivot connection defining a pivot axis,
(k) the safety coupling means includes a hinge connection with the frame, the hinge connection defining a hinge axis,
(l) the hinge axis and the pivot axis are substantially parallel and extend substantially in the same direction, the hinge axis and pivot axis being located in the same plane with the drawbar and draft member, yet the pivot axis is located rearwardly from the hinge axis.

9. In a hitch for connecting an implement drawbar to a three-point draft linkage of a tractor, the improvement comprising:
(a) a rigid frame,
(b) means operatively connecting the frame to the draft linkage,
(c) a first coupling means pivotally connecting the implement drawbar operatively to the tractor,
(d) a draft member,
(e) means attaching the draft member to the drawbar, and
(f) a safety coupling means operatively connecting the draft member to the frame above the first coupling means, the safety coupling means including separable, yet interconnected parts, the parts separating automatically upon tilting the frame to a predetermined angle under tension of the draft member,
(g) the draft member being attached to the drawbar rearwardly of the first coupling means and below the safety coupling means,
(h) the first coupling means including a pivot connection between the drawbar and frame, the pivot connection defining a pivot axis,
(i) the safety coupling means including a hinge connection with the frame on a hinge axis substantially parallel to and in the same direction as the pivot axis of the first coupling means,
(j) the draft member being flexible and operatively under tension, and
(k) the pivot axis being located rearwardly from the hinge axis.

References Cited

UNITED STATES PATENTS

| | | | |
|---|---|---|---|
| 2,712,279 | 7/1955 | Altgelt et al. | 280—452 X |
| 3,062,561 | 11/1962 | Wulff et al. | |
| 3,269,748 | 8/1966 | Mazery. | |
| 3,341,224 | 9/1967 | Bultheel et al. | |
| 3,341,225 | 9/1967 | Bultheel et al. | 280—449 |
| 3,347,560 | 10/1967 | Hodges et al. | |

FOREIGN PATENTS 1,430,633   1/1966   France.

LEO FRIAGLIA, *Primary Examiner.*

U.S. Cl. X.R.

172—7, 261; 280—415, 461